Dec. 27, 1960 R. J. ROCKWELL 2,966,636
MODULATION SYSTEM
Filed May 13, 1959
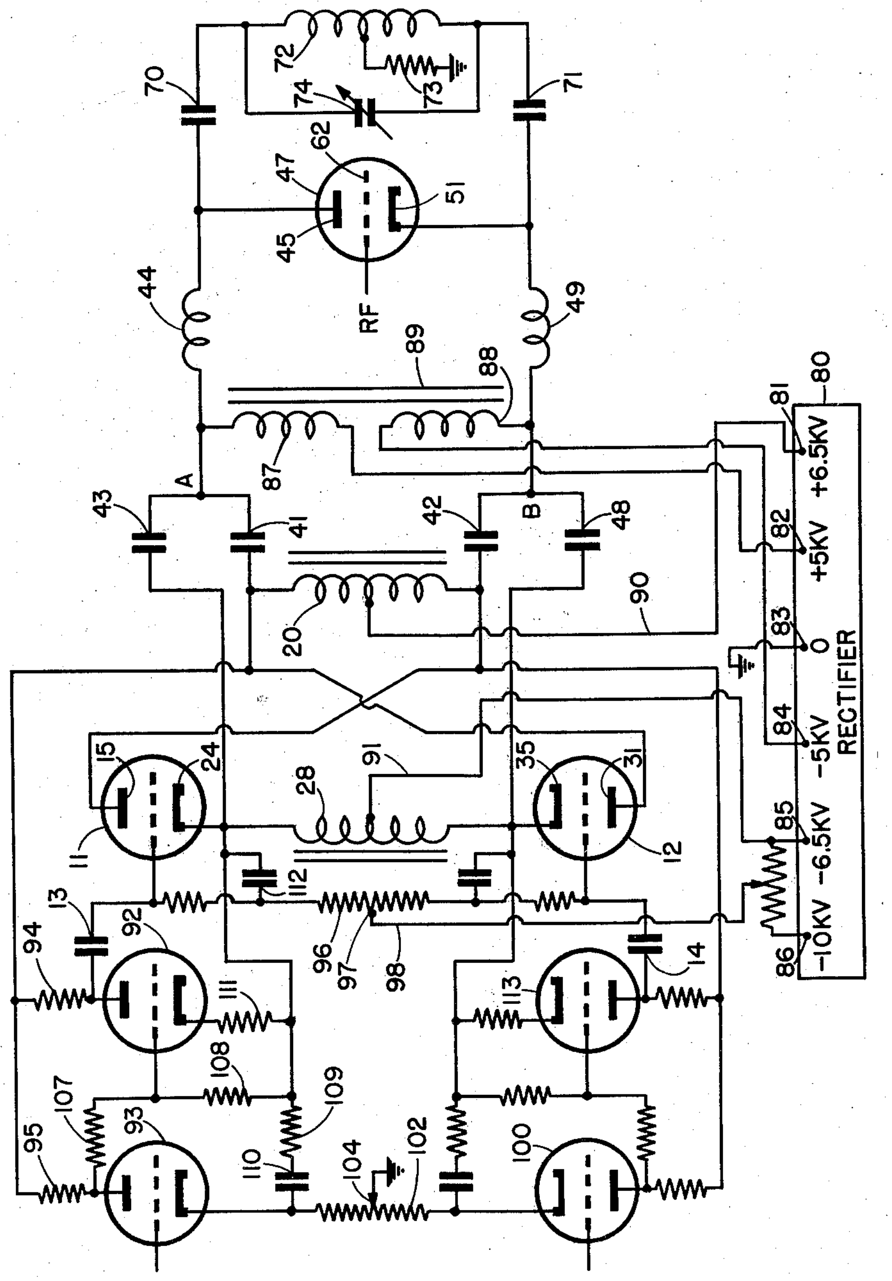
INVENTOR.
RONALD J. ROCKWELL.
BY Alden D Redfield
Charles M. Hogan
ATTORNEYS 2,966,636
Patented Dec. 27, 1960

2,966,636

MODULATION SYSTEM

Ronald J. Rockwell, Cincinnati, Ohio, assignor to Crosley Broadcasting Corporation, Cincinnati, Ohio, a corporation of Ohio Filed May 13, 1959, Ser. No. 812,912

5 Claims. (Cl. 332—60)

This invention relates to radio frequency transmitters and, more specifically, to modulation circuits for use in a radio frequency transmitter.

In my United States Patent No. 2,875,413, it is pointed out that high level modulation or plate modulation circuits, i.e., circuits where the high level radio frequency stage is modulated through its anode or plate voltage, usually include a modulation transformer between the audio frequency modulator and the modulated high level radio frequency stage. In such circuits, in order to keep the direct current supply of the radio frequency stage from saturating the modulation transformer core, it usually has been considered necessary to capacitively couple the output or secondary of the modulation transformer to a modulation reactance placed in the direct current plate supply circuit of the radio frequency stage. Inherently, the modulation transformer is in series relationship with any over-all feedback path and, in prior art circuits, this makes it extremely difficult to compensate for distortion arising from limitations of the transformer. As a result, circuits of this type cannot be relied upon to pass true high fidelity signals. In addition, prior art circuits which utilize a common direct current power source for the audio modulator and the high level radio frequency modulated stage have an inherent design problem arising from the fluctuations in the power drain of the modulator stage which, when reflected into the plate supply voltage of the radio frequency modulated stage, cause undesirable carrier shift, i.e., a shift in the carrier power output.

In the aforementioned patent there is provided a modulating system of the high level modulation type which eliminates the conventional modulation transformer, minimizes carrier shift, and transmits a very high fidelity signal.

The present invention is directed to the same general objects as the circuit of my U.S. Patent 2,875,413, and is a substantial improvement over the circuit disclosed and claimed therein.

The principal object of the present invention is to provide a combination of modulator stages and a modulated radio frequency (R.F.) output stage in which the floating rectifiers, disclosed in the aforementioned patent as placed in series circuit between the modulator and modulated stages, are dispensed with. The elimination of these rectifiers removes considerable stray capacity between the modulator output and ground. Further, a material savings in audio power is achieved because it is no longer dissipated in damping resistors across filter reactors associated with the floating rectifiers.

Another object of the invention is to increase the tightness of coupling between the cathode impedance of the modulator stages and the R.F. output stage.

Still another object of the present invention is to dispense with dropping resistors, which have a tendency to impair circuit balance.

For a better understanding of the present invention, together with other and further objects, advantages, and capabilities thereof, reference is made to the following description of the single figure of the drawing appended hereto.

The invention provides a transformerless modulator circuit which is coupled to modulate both the anode and the cathode circuits of a high level radio frequency modulated stage. The invention not only eliminates the need for a modulator output transformer, but also for floating rectifiers between the modulator and modulated stages.

In the single figure disclosing the preferred embodiment of my invention, I show a two-tube modulator amplifier stage including tubes 11 and 12. The anode 15 of modulator tube 11 is coupled to terminal 81 of a potential supply source 80 through one-half of an iron core inductor 20. The cathode 24 of modulator tube 11 is connected to rectifier terminal 85 through one-half of an iron core inductor 28. The anode 31 of modulator tube 12 is connected to terminal 81 in symmetrical fashion through one-half of inductor 20. Symmetrically, cathode 35 is connected to rectifier terminal 85 through one-half of inductor 28.

Anode 31 of modulator tube 12 is coupled to cathode 24 of modulator tube 11 through capacitors 41 and 43. In symmetrical fashion, anode 15 of modulator tube 11 is coupled to cathode 35 of modulator tube 12 through capacitors 42 and 48. The cathode-cathode output of the modulator is taken from across the cathode inductance of the two tubes 11 and 12, i.e., coil 28. The cathode 24 side of this output inductance is coupled through capacitor 43 and radio frequency filter choke 44 to anode 45 of the radio frequency amplifier filter tube 47. The cathode 35 side of this modulator output inductance is coupled through capacitor 48 and radio frequency filter choke 49 to cathode 51 of the radio frequency amplifier 47. The anode-anode output of the modulator is taken from across the inductance of the two tubes 11 and 12, i.e., coil 20. The anode 31 side of this output inductance is coupled to anode 45 of the radio frequency stage via capacitor 41. The anode 15 side of this inductance is coupled to the cathode 51 of the radio frequency output stage via capacitor 42.

Bias voltage is supplied to the grid-cathode circuit of radio frequency amplifier 47 in conventional manner.

Radio frequency carrier signals are taken from a source, not shown, and fed to the grid-cathode input circuit of tube 47.

The modulated output of radio frequency amplifier 47 is taken from across the anode-cathode path of the amplifier through coupling capacitors 70 and 71 to a load circuit which may comprise a tuned transformer primary, including tuning capacitor 74 and coil 72 which is center-tapped to ground through a resistor 73.

The principal feature of the invention is described at this point. It will be noted that the floating rectifiers of U.S. Patent 2,875,413 have been dispensed with. The anode-cathode work circuit of the R.F. output tube 47 is now energized in the following manner. A split inductance comprising windings 87 and 88, on a common core 89, has two terminals connected to terminals 82 and 84 of the power supply, and two terminals connected in circuit with the chokes 44 and 49, respectively. That is to say, winding 87 is connected between choke 44 and terminal 82, which is at +5000 volts, for example. Similarly, winding 88 is connected between choke 49 and terminal 84, which is at −5000 volts, for example. Terminal 83 of the power supply is grounded. By reason of these connections, anode 45 of R.F. modulated output stage 47 is subjected to a potential of +5000 volts. Similarly, cathode 51 is subjected to a potential of −5000 volts. The high stray capacities to ground heretofore presented by the rectifier connections are dispensed with.

Terminal 81 of power supply 80 is at +6500 volts and is connected by line 90 to a center tap on inductance 20 to supply D.C. power to the anodes of all of the tubes in the modulator and driver stages.

The cathode circuits of the modulator tubes 11 and 12 are returned by conductor 91 to terminal 85 of the power supply 80, which is at —6500 volts, for example, whereby there exists a net D.C. voltage differential on the order of 13,000 volts between the cathodes and anodes of tubes 11 and 12. Modulator tube 11 is driven by a tube 92, in turn driven by a tube 93, these tubes being provided with anode resistors 94 and 95, respectively, each in circuit with conductor 90 and terminal 81. Bias is provided for the grids of tubes 11 and 12 by a grid resistor 96 which has a center tap 97 connected via conductor 98 to a rheostat in series with terminal 86 of the voltage supply (that terminal being at —10,000 volts, for example).

Between the cathodes of driver tubes 93 and 100 is connected resistor 102, adjustably but symmetrically tapped by a grounded contact 104. The output of tube 93 is coupled to tube 92 by a suitable coupling network comprising resistors 107, 108, and 109 and blocking capacitor 110.

Tube 92 has a cathode resistor 111, and the cathode-grid path of tube 11 is completed for audio frequency currents by capacitor 112.

It will be understood that tubes 100 and 113 correspond, respectively, to tubes 93 and 92, and are provided with associated components and connections corresponding to those just described in detail with reference to tubes 92 and 93.

Modulator tubes 11 and 12 are both biased approximately at cutoff, and radio frequency amplifier 47 is biased for class C operation. Audio signals are fed through coupling capacitors 13 and 14 to drive the control grids of the modulator tubes. The audio signal on the grid of modulator tube 11 can be considered to be 180 degrees out of phase with the audio signal on the grid of modulator tube 12. However, since only one of the modulator tubes is producing output signals at any given instant, the signals on the grids of the modulator tubes need not be perfectly symmetrical. That is, it is unnecessary to use undistorted audio signals to cut off either modulator tube during the portions of the cycle when the other modulator tube is producing the useful output.

Assuming that an audio signal, which at the instant in question is just starting a positive going excursion, is impressed on the input circuit of modulator tube 11, and that the phase-inverted version of the same audio signal which is impressed on the control grid of modulator tube 12 is just starting a negative going excursion, it can be seen that the negative signal on the control grid of modulator tube 12 will drive this tube to cutoff and that the positive going signal on the grid of modulator tube 11 will allow current to flow between anode 15 and cathode 24, thereby increasing the voltage on modulator output terminal A, due to the current flowing through inductance 28. Since modulator tube 12 is cut off, the voltage on output terminal B is controlled by the voltage on anode 15 of modulator tube 11 by virtue of the coupling action of capacitor 42. Thus, it can be seen that a positive signal excursion on the control grid of modulator tube 11 effects a positive signal excursion on output terminal A and an equal and opposite negative signal excursion on output terminal B.

When the audio signal passes through its alternating current axis so as to drive the control grid of modulator tube 12 with a positive going signal excursion, modulator tube 11 is cut off by a negative signal excursion on its grid, and the voltage on the output terminals A and B results from current flow through modulator tube 12 alone. During this portion of the cycle the voltage on output terminal B increases in the positive going direction because of modulator tube 12 anode-cathode current flow through inductance 28. The negative voltage excursion on anode 31 is coupled to output terminal A through capacitor 41, and thus the negative voltage excursion on terminal A is equal and opposite to the positive going excursion on terminal B during this part of the cycle. As the audio signal passes through its alternating current axis, a second complete cycle is started and modulator tube 12 is cut off while modulator tube 11 again controls the voltage on the modulator output terminals A and B. Thus, it can be seen that the voltages on the anode and cathode of the operating tube, i.e., the tube carrying signal at any given instant, controls both the positive and negative signal excursions on the output terminals A and B during the instant in question.

Radio frequency filter chokes 44 and 49 act to isolate the modulator output from the radio frequency carrier signals. Thus, the modulated stage has an anode-cathode voltage which, in the absence of a signal across the modulator output terminal, is supplied by the power supply. When a signal is impressed across modulator output terminals A and B, both the anode and cathode voltages of the modulated stage are varied in accordance with the audio signal output of the modulator to provide anode modulation and simultaneous equal and opposite cathode modulation.

The elements 87, 88, and 89 constitute a split inductance with four terminals. The windings 87 and 88 are preferably on a common core formed with an air gap to prevent core saturation.

The grid of amplifier 47 is driven by a voltage at carrier frequency, and the anode and cathode are driven by a voltage at the audio frequency. The resultant modulated output is then taken from across the anode-cathode path of tube 47 through coupling capacitors 70 and 71 and fed to a transformer primary winding 72 which is center-tapped to ground through resistor 73 and tuned by variable capacitor 74.

The voltage supply 80 has the following terminals:

| | |
|---|---|
| **81** | +6500 volts. |
| **82** | +5000 volts. |
| **83** | Ground. |
| **84** | —5000 volts. |
| **85** | —6500 volts. |
| **86** | —10,000 volts. |

While there has been shown and described what is at present considered to be the preferred embodiment of the invention, it will be understood by those skilled in the art that various changes and modifications may be made therein without departing from its true scope as defined by the appended claims. For example, the iron cores of inductances 20, 28, and 87—88 could be dispensed with if sufficient copper is employed or if extremely low frequency operation is not required. Further, these three inductances could be placed on a common core for more economical use of materials.

I claim:

1. In a signal translating circuit, the combination comprising a symmetrical impedance having two ungrounded end terminals, means coupled to said impedance for developing 180 degree phase displaced audio signals at said end terminals, a radio frequency stage having at least an anode, a cathode and a control electrode, means for applying carrier signals to said control electrode, means for coupling one of said terminals to said anode and for coupling the other of said terminals to said cathode, and a shunt-feed power supply circuit for said stage comprising a power source having positive and negative terminals and inductances in series between said positive and negative terminals and the anode and cathode of said radio frequency stage, said power supply circuit being in essentially parallel relation to said impedance.

2. The combination of first and second vacuum tubes each having anode and cathode and control electrodes, means for biasing said tubes for class B operation, a source of push-pull signals connected to said control electrodes, a pair of output terminals, an impedance having a center tap and connected between said anodes, an impedance having a center tap and connected between said cathodes, means for coupling the anode of one of said tubes and the cathode of the other tube to one of said terminals, means for coupling the anode of the other of said tubes and the cathode of said one tube to the other of said terminals, whereby each tube supplies current to said impedances on alternate half cycles, a third vacuum tube having anode and ungrounded cathode and control electrodes, first coupling means between one of said termianls and the last-named anode, and second coupling means between the other terminal and the last-named cathode, and means essentially in parallel with said impedances for rendering the anode of said third tube positive relative to its cathode, the last-named means comprising a power source having positive and negative terminals and an iron-cored split inductance having a winding in series between said positive terminal and the last-named anode and a winding in series between said negative terminal and the last-named cathode.

3. The combination in accordance with claim 2 in which the last-named windings are on a common iron core having an air gap formed therein.

4. In a signal translating circuit, the combination of:

first and second push-pull connected modulator tubes each having anode and cathode and control electrodes, a first symmetrical impedance having first and second ungrounded end terminals connected to and in series with the cathodes of said first and second tubes, respectively, a second symmetrical impedance having third and fourth ungrounded end terminals individually connected to and in series with the anodes of said second and first tubes, respectively, a radio frequency stage having at least an anode, cathode, and control electrode, means for coupling the first and fourth end terminals of said impedances to the anode of said radio frequency stage, said means comprising a pair of individual capacitors, means for coupling the remaining end terminals of said imepdances to the cathode of said radio frequency stage, the last-named means comprising another pair of individual capacitors, a power supply having positive and negative terminals and a grounded center tap, and inductances for connecting said positive and negative terminals to the anode and cathode of said radio frequency stage, said inductances and power supply being in shunt relation to the circuit between said anode and cathode and essentially shunt relation to said impedances, each of said inductances being directly connected to two of said capacitors.

5. In a signal translating circuit, the combination in accordance with claim 4 in which the radio frequency stage operates in class C, and means for applying radio frequency carrier signals to the control electrode of said radio frequency stage.

References Cited in the file of this patent

UNITED STATES PATENTS

| | | |
|---|---|---|
| 2,120,800 | Ditcham | June 14, 1938 |
| 2,711,512 | Rockwell | June 21, 1955 |
| 2,895,019 | Farber | July 14, 1959 |